No. 613,588. Patented Nov. 1, 1898.
J. W. MOORE & J. A. WHITE.
WIRE GUIDE FOR PAPER MAKING MACHINES.
(Application filed Feb. 5. 1898.)
(No Model.)
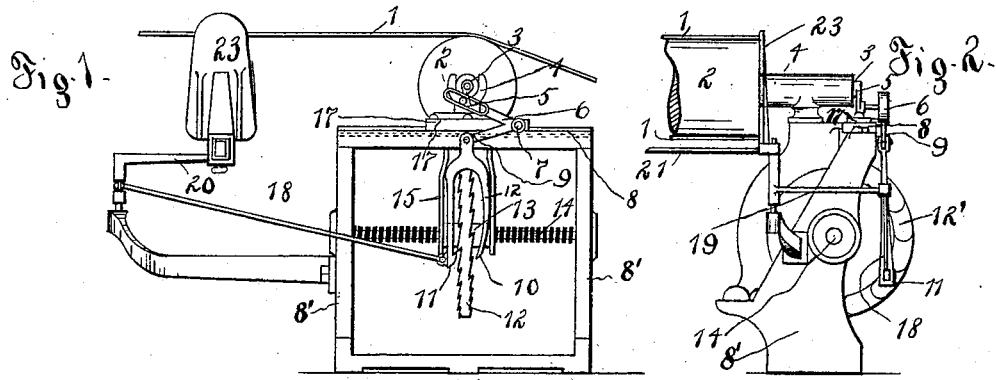
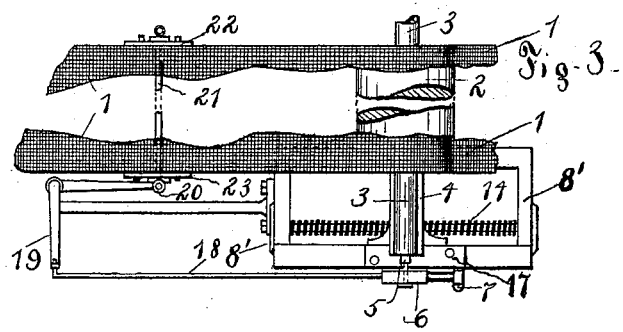
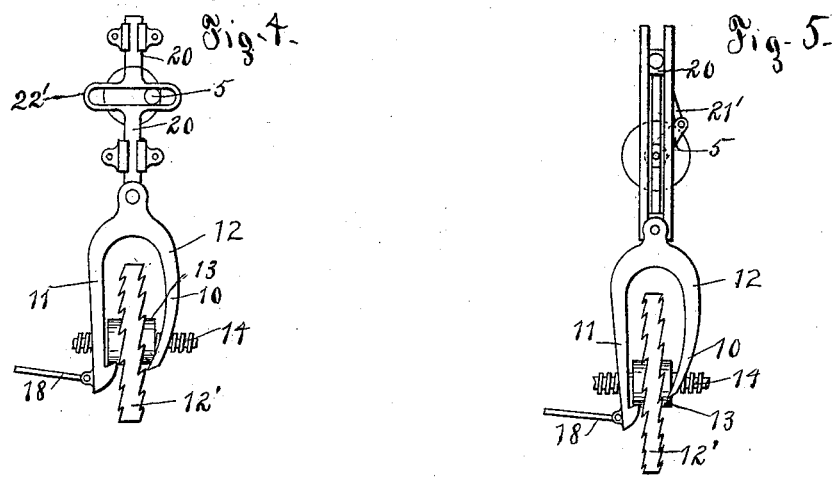
WITNESSES:
INVENTORS:

UNITED STATES PATENT OFFICE.

JOHN W. MOORE AND JOSEPH ATWOOD WHITE, OF PHILADELPHIA, PENNSYLVANIA.

WIRE-GUIDE FOR PAPER-MAKING MACHINES.

SPECIFICATION forming part of Letters Patent No. 613,588, dated November 1, 1898.

Application filed February 5, 1898. Serial No. 669,242. (No model.)

*To all whom it may concern:*

Be it known that we, JOHN W. MOORE and JOSEPH ATWOOD WHITE, citizens of the United States, residing at Philadelphia, in the county of Philadelphia and State of Pennsylvania, have invented certain new and useful Improvements in Wire-Guides for Paper-Making Machines; and we do hereby declare the following to be a sufficiently full, clear, and exact description thereof to enable others skilled in the art to make and use the said invention.

This invention relates to wire-guides for correcting and regulating the travel sidewise of the making-wires of paper-making machines, and has for its object the avoidance of the irregular and uncertain operation experienced in wire-guides as heretofore made when applied to high-speeded paper-making machines as at present in general use.

To this end this invention consists in the interposition of an intermediate guiding mechanism between the actuating-crank and the pawl, which avoids the lateral oscillations incident to the directly-connected crank-motion device patented by John W. Moore in United States Letters Patent No. 212,485, dated February 18, 1879.

This invention is illustrated in the accompanying drawings and is hereinafter fully described.

Referring to the drawings, Figure 1 shows a side elevation of the parts of the paper-making machine to which this device is applied; Figs. 2 and 3, a front elevation and plan thereof, and Figs. 4 and 5 modifications of the construction embodying this invention.

Referring to Figs. 1, 2, and 3 of the drawings, 1 represents part of the making-wire of a paper-making machine, supported upon the roller 2, having a journal 3, turning in a bearing 4, supported on a slide 17, said roller 2 supporting and guiding the making-wire. Upon the end of the journal 3 is a crank 5, which may be made adjustable in length of stroke. The crank 5 works in a slotted lever 6, as shown in Figs. 1, 2, and 3, turning or oscillating upon the fulcrum 7, attached to the slide 17 on the guide 8 on a frame 8' of the machine.

To the arm 9 of the lever 6 is attached a double pawl 10, having one arm 11 hooked and the other arm 12 straight, which alternately engage in ratchet-teeth upon opposite sides of the wheel 12', secured upon and turning a nut 13 upon the screw 14, which moves by means of the cheek-pieces 15, fitted to bear upon the opposite ends of the nut 13 and secured to the slide 17, supporting the bearing 4, so that the engagement of the pawls 11 and 12 upon either side of the ratchet-wheel turns it in one or the other direction, as the pawl may be engaged. The engagement and disengagement of the pawl is controlled by the rod 18, connected with an angle-lever 19, one arm of which is pivotally connected at 20 with a bar 21, having gages or guides 22 and 23, by which the making-wire 1 passes, so that when the making-wire 1 presses against the guide 22 the hooked pawl 11 engages the ratchet, and when the guide 23 presses upon the edge of the making-wire 1 the straight pawl 12 engages the ratchet, and by turning the nut alternatively in one direction and the other, so as to automatically adjust the roller 2 in the direction of its axial line of support, by moving the slide 17 and bearing 4, as to always lead the making-wire in the proper direction.

In machines of this character as previously constructed the attachment of the pawl has been directly to the crank-pin, and in slow-running machines these were satisfactory for the manufacture of paper and answered the purposes measurably well; but with the demands for an increased output from paper-making plants, rendered possible by other improvements in the machines and imperative by competition, the lateral oscillation incident to the motion of the crank rendered proper engagement of the pawls with the ratchet-wheels irregular and uncertain. This has been cured in this device by interposing a guide consisting, as shown in Figs. 1, 2, and 3, of the pivotally-supported lever 6, to which the pendulously-supported double pawl is attached, and moves the upper end of the pawl in an arc of long radius, or, as shown in Figs. 4 and 5, a right-lined guide 20 is substituted, and, as shown in Fig. 4, a slotted bar is applied, or, as in Fig. 5, a connecting-rod 22' is applied to the crank 5, so that the engagement and disengagement of the double pawl occurs upon either side and alternatively of the ratchet-wheels upon the nut, which is independent of and not affected by oscillation or vibration of the crank in horizontal direction.

Having described our invention, what we claim is—

In an automatic guiding mechanism for the making-wires of paper-making machines, guides adapted to contact with the opposite edges of the making-wire and to derive lateral motion therefrom, a roller contacting with the making-wire and deriving rotary motion therefrom, a horizontally-adjustable bearing supporting one end of said roll, a screw and nut connected with the horizontally-adjustable bearing to adjust the same, a ratchet-wheel attached to said nut having teeth arranged to be turned in both directions, a double pawl arranged to turn said ratchet-wheel in both directions, a pivot supporting and operating said pawl, means connected with said roll in combination with a guide applied to said pivot to reciprocate said pivot, and means for connecting said making-wire guides to said double pawl to engage it alternately in either direction as and for the purpose set forth.

JOHN W. MOORE.
J. ATWOOD WHITE.

Witnesses:
FRANK B. JAQUETT,
SHELTON A. HIBBS.